June 23, 1959  H. DEURING ET AL  2,891,593
RESILIENT VEHICLE WHEEL
Filed Oct. 28, 1955
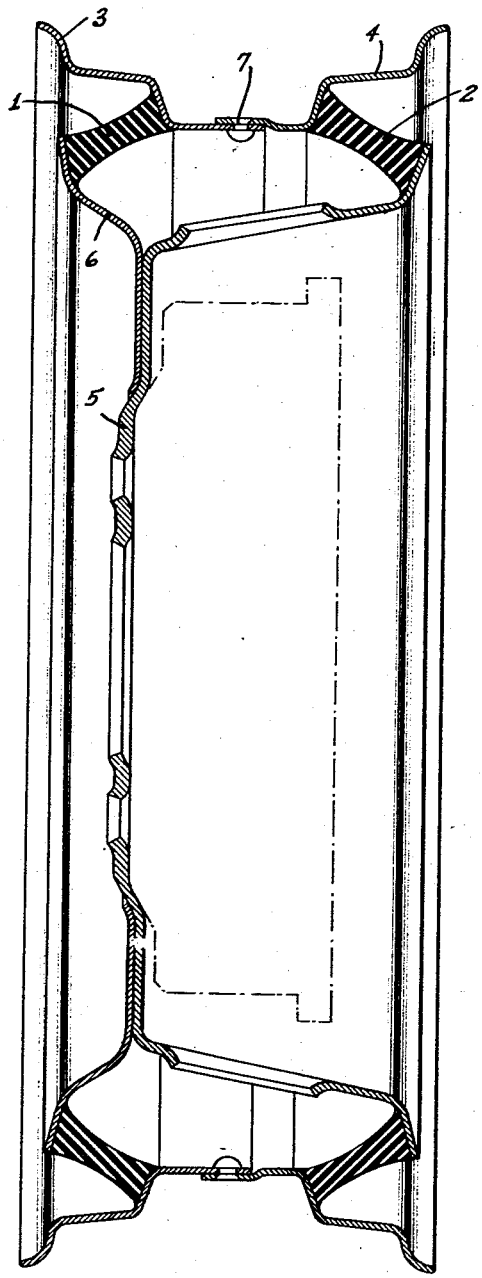
Inventors
HANS DEURING
MAX ADOLF MÜLLER
WERNER SELL

United States Patent Office 2,891,593
Patented June 23, 1959

2,891,593

RESILIENT VEHICLE WHEEL

Hans Deuring, Burscheid, near Koln, Max Adolf Müller, Koln, and Werner Sell, Opladen, Germany, assignors, by mesne assignments, to Rand-Goetze Corporation, Cleveland, Ohio, a corporation of Ohio Application October 28, 1955, Serial No. 543,562

Claims priority, application Germany November 2, 1954

1 Claim. (Cl. 152—49)

The present invention relates to a resilient vehicle wheel equipped with one or more elastic rubber rings. It is known to create an additional spring effect by resiliently arranged wheel spokes or by rubber bands within the wheel. The lateral rigidity necessary therefor, is attained by hinged joints and sliding guides. However, elements of this type render the wheel liable to disturbances. It has also been proposed to provide at least one rubber ring between the hub and the rim of the wheel, this ring being connected with the hub and the rim via supporting and lateral guiding disks. Resilient wheel devices of this type take up the lateral forces via sliding disks positioned between the guiding disks. Furthermore, resilient wheel devices have been known that operate without sliding disks, but such wheels lack the necessary stability.

The present invention is based on the realization that the resilient arrangement must be located adjacent the tire since the lateral forces are smaller at this point than in the proximity of the hub.

According to the present invention, it is, therefore, proposed to connect the elastic rings, on the one hand, in a manner known per se, to supporting disks secured to the hub and, on the other hand, to the rim by vulcanization. It may be advisable to provide an intermediate disk between rim and rubber ring so as to simplify production and assembling. Since the rings are positioned adjacent the attacking lateral force, guiding disks are unnecessary. Preloading the rubber will, in most instances, not be necessary. The lateral forces are taken up by the elastic rings so that the roadability of the entire vehicle will be improved. The tire noises produced particularly when traveling through a curve, are being absorbed by the separation of the metal elements through the rubber rings so as to improve also the traveling ease in addition to improved resiliency and roadability.

The inner diameter of the rim preferably is smaller than the outer diameter of the supporting disk so as to prevent the rim from being thrown out by any premature destruction of the elastic rings.

For reasons of production, the rim may be divided, preferably along its longitudinal median plane. After the rubber rings are secured in position, particularly by vulcanization, the rim is assembled by welding, riveting or the like.

The drawing illustrates an embodiment of the invention.

The rubber rings 1, 2 which are vulcanized directly to the divided rim, connect the latter with the wheel disk 5. The rubber ring 1 is secured at its outer end to a supporting disk 6 attached to the wheel disk 5. The joining surfaces of the rubber rings 1, 2 are of conical design so as to take up compressive tension under stress within the range of the attacked radial load. The rim portions 3, 4 are interconnected by rivets 7 so as to permit vulcanization of the rim portion 3, the rubber ring 1 and the supporting disk 6 in a separate operation from that of the rim portion 4, the rubber ring 2 and the wheel disk 5.

We claim as our invention:

A wheel which comprises a hub part, a rim part, said hub part extending radially outwardly nearer one side of the wheel and then having a generally axially extending part leading to the other side of said wheel, an annular disk secured to said radially extending hub part, said hub part and disk providing axially spaced first anchorages adjacent the rim and radially nearer to the rim than to the axis of the wheel, said rim part having a drop center and being divided in the mid-portion of said drop center to provide two sub-divided rim parts, each of said sub-divided rim parts having a generally radially inwardly extending portion connected with said drop center which portions provide axially spaced second anchorages, each of said second anchorages respectively associated with a first anchorage in generally axially aligned inwardly spaced, relationship thereto, a pair of opposed elastic rings each extending substantially axially of the wheel and being related to each other such that the included angle therebetween is a wide obtuse angle, each ring having an axial outer end secured to a first anchorage and an axial inner end secured to a second anchorage, each ring having generally the shape of a surface of revolution in which the generatrix is a straight line and lies in the same plane as the axis of revolution and which shaped ring provides straight line connections between the anchorages which will not fold while accommodating radial and circumferential displacements of the hub and rim parts, each ring having its intermediate portion between said anchorages unsupported, the width of said intermediate portion in the axial direction being in the range of two to five times as great as its thickness in the radial direction, one of said elastic rings being vulcanized to a first anchorage on said disk and to a second anchorage on one of said sub-divided rim parts, the other of said elastic rings being vulcanized to a first anchorage on said hub part near said other side of the wheel and to a second anchorage on the other of said sub-divided rim parts, means securing said sub-divided rim parts together, whereby said one ring may be separately bonded to said disk and to said one sub-divided rim part, after which said disk may be secured to said hub part.

References Cited in the file of this patent

UNITED STATES PATENTS

| | | |
|---|---|---|
| 969,416 | Smith | Sept. 6, 1910 |
| 2,555,023 | Boschi | May 29, 1951 |
| 2,671,488 | Christensen | Mar. 9, 1954 |
| 2,770,278 | Dillon | Nov. 13, 1956 |

FOREIGN PATENTS

| | | |
|---|---|---|
| 241,625 | Great Britain | Oct. 29, 1925 |
| 1,053,995 | France | Oct. 7, 1953 |

(Corresponding U.S. Pat. 2,798,525, July 9, 1957)